UNITED STATES PATENT OFFICE.

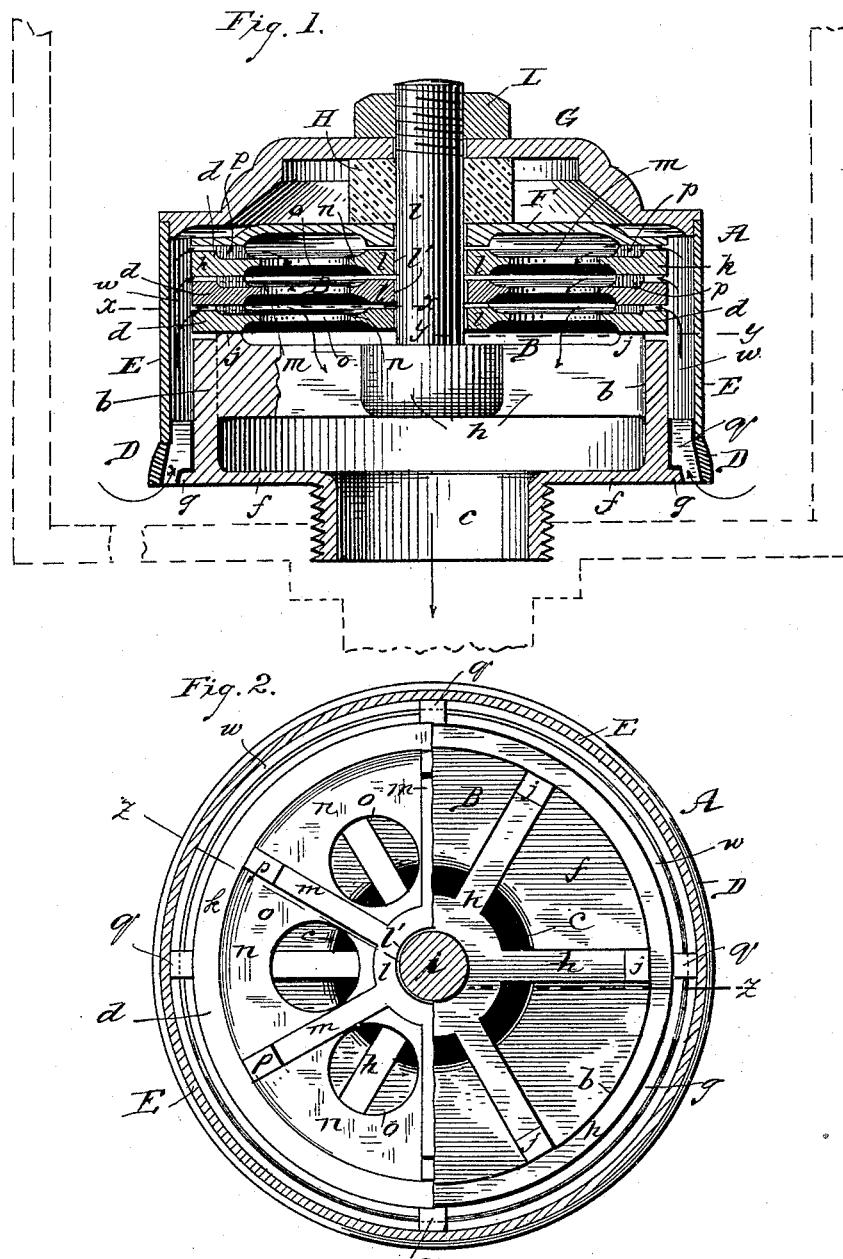

BENJAMIN F. PERKINS, OF HOLYOKE, MASSACHUSETTS.

FILTER.

SPECIFICATION forming part of Letters Patent No. 460,311, dated September 29, 1891.

Application filed March 20, 1889. Serial No. 303,993. (No model.)

*To all whom it may concern:*

Be it known that I, BENJAMIN F. PERKINS, a citizen of the United States, residing at Holyoke, in the county of Hampden and State of Massachusetts, have invented new and useful Improvements in Filters, of which the following is a specification.

This invention relates to improvements in filtering apparatus, more particularly to a device to be employed in a filtering-tank comprising a filtering material, as sand and gravel, &c., which device is to be located within the tank at the outlet or one of the sub-outlets thereof, and having for its purpose mainly the prevention of any portion of the filtering sand or gravel of the tank flowing through the outlet thereof, and also having for its object the production of a device which is susceptible of freely permitting a reverse current of water to be passed therethrough for cleansing the filtering medium of foreign matter intercepted thereby and commingled therewith. In other words, the invention relates to an improvement in filtering apparatus of the character set forth in an application for Letters Patent of the United States filed by me November 20, 1888, Serial No. 291,400; and the invention consists in the construction and combination of the various parts, all substantially as will hereinafter more fully appear, and be set forth in the claims.

Reference is to be had to the accompanying drawings, in which Figure 1 is a vertical section of my improved filter, and Fig. 2 is a horizontal section thereof, taken on the planes indicated by the lines *x x* and *y y* of said Fig. 1. The vertical planes of section for the said first figure are indicated by the line *z z* of Fig. 2.

The filter device of this invention, or, more particularly, the collecting-tube for the filter proper, consists of a hollow cylindrical or otherwise suitably-formed body A, closed at its top, having openings thereto at or near its bottom, and provided interiorly with a supplemental body B, of less diameter than that of the filter-body proper, also chambered, and having an outlet-passage leading therefrom through the bottom of the filter, and having its upper portion comprised in one or more ring-sections *d*, normally separated with relation to the edges thereof to communication between the chamber of the main filter-body and the said supplemental chamber.

As to the specific construction of the filter, which, however, may be departed from more or less under the terms of the above general statement of the essentials of the filter, a casting *b*, of cylindrical form, is provided practically open at its top and having an opening *c* for an outlet through its otherwise closed bottom *f*, and at its bottom the casting is exteriorly provided with an outwardly-extending narrow flange *g*. A spider-frame *h* is formed with and extends across the upper part of said casting, on which is centrally supported a vertical spindle *i*. More or less of the arms of said spider-frame have bosses *j* of slight height formed on their upper sides.

Each of the ring-sections *d*, as shown, comprises an outer ring or rim *k*, a hub portion *l*, having an axial aperture *l'*, radial arms *m*, uniting said hub and rim, and thin webs *n*, connecting the arms and lying between the planes of the upper and lower sides thereof, said webs being provided with perforations *o*, and more or less of said ring-sections on their one side are provided with bosses *p*, having a slight degree of projection beyond the face of the ring. One of said ring-sections is placed on the casting *b*, being held slightly above the same by the bosses *j*, and upon said ring-section is placed one or a number more of such sections, all thereof by their bosses being slightly separated as to the relation of their edges and having sub-chambers or shallow pockets between the webs thereof in communication with each other through the web-openings *o*.

A ring D of larger diameter than the body of the casting *b* is supported on the flange thereof by lugs *q*, on which rests a cylindrical casing E, that extends higher than the top of the casting and forms the inclosing walls of the chambered body proper, there being an annular space *w* between the inner wall of the said casing and the outer wall of the casting and the edges of the ring-sections. The sections *d* are preferably so relatively placed that their openings *o* do not coincide, thereby making circuitous passages through the filter.

Upon and above the uppermost ring-section rests a disk F of about the diameter of said section, fitting by its axial aperture over said spindle $i$ and closing communication between the annular space $w$ and the web-openings of the top section, and above all is a cap G, interiorly of dome shape, centrally apertured to fit over said spindle, and by its edge portion resting on the upper end of the casing E. A spring H, of rubber or metal, is placed between the said disk F and said cap G, and by the single nut L all the parts are held closely and firmly together, the ring-sections being capable of separating under a sufficient pressure exerted thereon from below and under the compression of the spring.

In use the filter described is placed in the bottom of a filter-tank containing a body of sand, gravel, or other filtering material, as described in my other said application for a patent, to which tank water is supplied from any source, and either under a hydrostatic or artificial pressure it flows downwardly through said granulated filtering-body, and, as indicated by arrows in Fig. 1, upwardly into the annular chamber $w$, thence between the slightly-separated ring-sections forming the upper part of the interior body of the filter, which is of a honey-comb form, and thence downwardly through the chambered casting $b$ and the outlet $c$ thereof to any suitable conduit connected thereat. The sand or gravel liable to move off with the water being filtered will be practically arrested from passing between the edges of the slightly-separated ring-sections, and should such particles pass between said sections they will lodge in the web-formed pockets thereof, and the greater the number of sections employed within reasonable limits the more efficient will be the filter embodying them. A reverse current of water forced with sufficient pressure through the outlet-opening into the filter will cause a spreading vertically of the ring-sections one from the other and from the casting $b$ against the spring H, whereby free egress for a large volume of water to be forced from the inner supplemental body of the filter may be had, and after the reverse forcing current has ceased the ring-sections under the recoil of their spring will by their bosses again come into contact.

What I claim as my invention is—

1. A collecting-tube for a filter, consisting of an outer hollow body or shell closed at its top, having openings thereto at or near its bottom, and provided interiorly with a supplemental tubular body $b$ of less diameter than that of the said main shell, which is open at its bottom and also at its top, and provided at the top of said body with a series of ring-sections separated at their edge portions and each interiorly provided with webs and apertures, and a cover for the uppermost ring-section, substantially as described.

2. A collecting-tube for a filter, consisting of an outer hollow body or shell closed at its top, having openings thereto at or near its bottom, and provided interiorly with a supplemental tubular body or casting open at its top and bottom, and of less diameter than that of the outer shell, and provided with an axial post extending upwardly above the open top of said casting, a series of ring-sections provided with interior apertured hubs fitting over said post, and apertured webs connecting said hubs with the rings, and said rings held separated the one from the other, and a cover for the uppermost ring-section, substantially as described.

3. In a collecting-tube for filters, the combination, with the casting $b$, of cylindrical form, having the contracted and externally-screw-threaded passage $c$ extending centrally from its bottom and provided at its bottom with the upwardly-extended lugs $q$, arranged at intervals, and at its upper portion with the radial arms and central hub with the upwardly-extending post $i$, of the series of ring-sections separated at their edge portions and each having central apertured hubs which surround said post, and apertured webs connecting said hubs and the edge portions of the ring-sections, the cover overlying and closing the uppermost ring-section, and the outer cylindrical shell closed at its top and supported on the ring D, which is larger than the diameter of the casting $b$ and is supported on said lugs $q$, substantially as set forth.

4. In a collecting-tube for filters, the combination, with the casting $b$, open at its top and also at its bottom and provided with the axially-supported and upwardly-extended post, which is screw-threaded at its upper end, of the series of ring-sections, each comprising an outer ring $k$, an internal apertured hub $l$, and a connecting apertured web $n$, said sections engaged with and surrounding said post and held separated the one from the other, the cover F for closing the uppermost ring-section, also centrally apertured and surrounding said post, the outer cylindrical shell E, of diameter larger than that of the casting $b$, and ring-sections, with an opening to the annular chamber between said parts which leads to the lower portion of the annular chamber, the outer cover or cup G, centrally apertured to fit over said post and to rest by its border portion upon the upper edge of the said shell E, and the spring between the top of the cover F and the inner upper wall of the outer cup-shaped cover G, all substantially as described, for the purposes set forth.

5. A ring-section for collecting-tubes for filters, comprising the bored hub $l$, the outer rim $k$, the connecting-arms $m$, and the apertured webs $n$, substantially as described.

BENJAMIN F. PERKINS.

Witnesses:
H. A. CHAPIN,
WM. S. BELLOWS.